(12) United States Patent
Lee

(10) Patent No.: US 6,229,681 B1
(45) Date of Patent: May 8, 2001

(54) SWITCHING MODE POWER SUPPLY APPARATUS HAVING A LOW VOLTAGE PROTECTION CIRCUIT

(75) Inventor: Joo-Hyoung Lee, Suwon (KR)

(73) Assignee: SamSung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/263,807

(22) Filed: Mar. 8, 1999

(30) Foreign Application Priority Data

Mar. 7, 1998 (KR) .................................................. 98 /7650

(51) Int. Cl.[7] ....................................................... H02H 3/00
(52) U.S. Cl. ................................ 361/92; 361/18; 361/115
(58) Field of Search ................................... 361/18, 59, 90, 361/92, 115

(56) References Cited

U.S. PATENT DOCUMENTS

| 4,999,730 | 3/1991 | Pickard | ................................... 361/59 |
| 5,818,670 | * 10/1998 | Ahn | ....................................... 361/18 |

* cited by examiner

*Primary Examiner*—Stephen W. Jackson
(74) *Attorney, Agent, or Firm*—Robert E. Bushnell, Esq.

(57) ABSTRACT

A switching mode power supply apparatus has a low voltage protection circuit with a simple construction. The apparatus is not actuated or have its operation stopped under brown-out conditions where the voltage value of the input is reduced to a predetermined value. The switching mode power supply apparatus includes a first rectifying and smoothing circuit, an actuating power supply unit having an overvoltage protection circuit, a switching transistor, a switching transformer, a switching transformer, a second rectifying and smoothing circuit, a third rectifying and smoothing circuit, a constant-voltage circuit, a first protection circuit, and a second protection circuit.

32 Claims, 3 Drawing Sheets

SWITCHING MODE POWER SUPPLY APPARATUS HAVING A LOW VOLTAGE PROTECTION CIRCUIT

CLAIM OF PRIORITY

This application makes reference to, incorporates the same herein, and claims all benefits accruing under 35 U.S.C. §119 from an application for SWITCHING MODE POWER SUPPLY APPARATUS HAVING A LOW VOLTAGE PROTECTION CIRCUIT earlier filed in the Korean Industrial Property Office on the Mar. 7, 1998 and there duly assigned Serial No. 7650/1998.

BACKGROUND OF THE INVENTION

1. Technical Field

The present invention relates, in general, to a switching mode power supply (SMPS) unit having a protection circuit for a brown-out condition and, more particulary, to a switching mode power supply apparatus having a protection circuit for a brown-out condition in which, if an input alternating voltage is below a predetermined value, it is detected so that a switching mode power supply apparatus cannot be actuated or, if actuated, its operation is stopped. As a result, the switching mode power supply apparatus and a load circuit connected to an output terminal of the switching mode power supply apparatus are protected from the influx of excessive current.

2. Related Art

Generally, electric or electronic equipment need a direct current power supply apparatus which converts an alternating current (AC) power source to a predetermined DC power source so as to enable the system therein to be operated, for which a switching mode power supply apparatus of small size and light weight is mainly employed as a DC power supply apparatus.

U.S. Pat. No. 4,999,730 presents a solution to this problem but with disadvantages in that a power control device is necessary to directly control the alternating input, the control circuit is complicated, and an auxiliary power source is necessary for the control circuit.

As described in more detail below, prior switching mode power supply apparatus have several disadvantages. A primary disadvantage occurs when an input alternating voltage is less than a normal value, that is, when a brown-out condition occurs. Under such circumstances, the feedback controller of the apparatus applies a control signal to a pulse width modulation (PWM) controller of the apparatus. As explained in more detail below, this causes current accumulating in a secondary coil of the transformer of the apparatus to increase by an amount corresponding to the enlarged duty cycle of the PWM pulse generated by the PWM controller. As a result, circuitry of the apparatus or the load circuit connected to the apparatus can malfunction or be damaged due to overcurrent. As a further result, equipment employing the apparatus can also be damaged or break down.

SUMMARY OF THE INVENTION

An object of the present invention is to provide a switching mode power supply apparatus having a low voltage protection circuit of simple construction in which, when an input alternating current power becomes lower than a predetermined value, a switching mode power supply apparatus is not actuated, or its operation is stopped after the switching mode power supply apparatus is normally actuated, the purpose being to attain reliability in electric and electronic equipment employing the switching mode power supply apparatus, even in a brown-out condition.

To achieve the above objects, there is provided a switching mode power supply apparatus having a low voltage protection circuit including: a first rectifying and smoothing circuit for rectifying and smoothing an input alternating current voltage to output a direct voltage; an actuating power supply unit for receiving the output voltage from the first rectifying and smoothing circuit, and for converting it to a predetermined DC voltage; a PWM controller for being actuated upon receipt of output voltage from the actuating power supply unit, and outputting a predetermined pulse width modulation waveform, said PWM controller having an overvoltage protection circuit; a switching transistor which is switched by the output waveform of the PWM controller; a switching transformer for accumulating the output power of the first rectifying and smoothing circuit, applied to a first coil in accordance with the switching of the switching transistor, at a second coil and a third coil; a second rectifying and smoothing circuit for rectifying and smoothing the voltage accumulated at the second coil, and for outputting a predetermined DC voltage supplied to a load circuit; a third rectifying and smoothing circuit for rectifying and smoothing a voltage accumulated at the third coil of the switching transformer, and for outputting another predetermined DC voltage; a constant-voltage circuit for receiving the output voltage from the third rectifying and smoothing circuit, and for outputting the driving voltage of the PWM controller; a first protection circuit for receiving the output voltage from the first rectifying and smoothing circuit, and for controlling in such a way that an actuating power supply unit is not driven if the value of the output voltage of the first rectifying and smoothing circuit becomes lower than a predetermined value; and a second protection circuit for controlling in such a way that, when an input alternating current voltage becomes lower than a predetermined value, the output voltage of the constant-voltage circuit becomes higher, so that a driving voltage sufficient to operate an overvoltage protection circuit of the PWM controller is supplied to the PWM controller, thereby to stop the operation of the PWM controller.

Additional advantages, objects and other features of the invention will be set forth in part in the description which follows and in part will become apparent to those having ordinary skill in the art upon examination of the following or may be learned from practice of the invention. The object and advantages of the invention may be realized and attained as particularly pointed out in the appended claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A preferred embodiment of the present invention will now be described with reference to the drawings.

Figure 1:
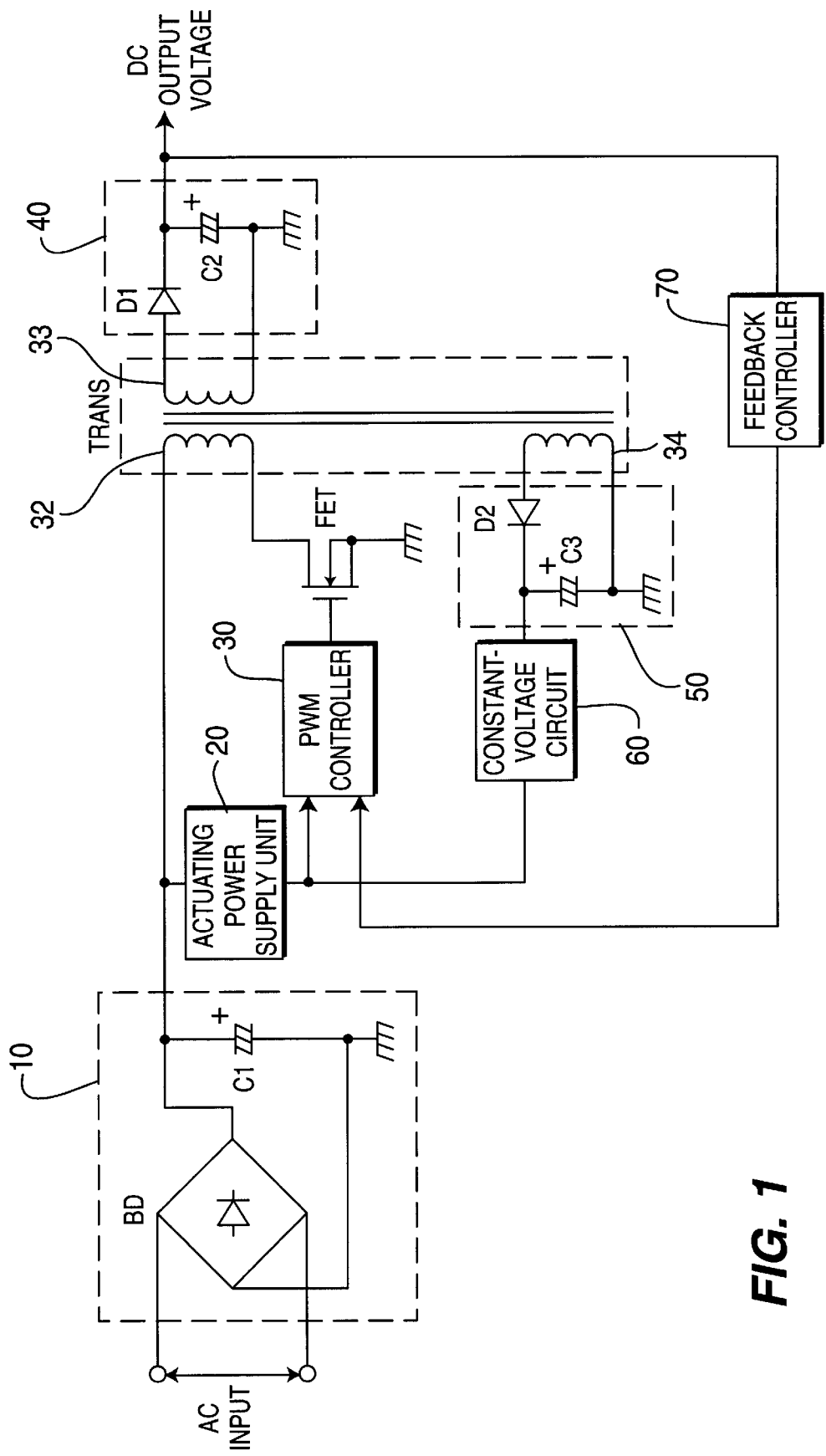
FIG. 1 is a block diagram of a switching mode power supply apparatus.

FIG. 1 is a block diagram of a switching mode power supply apparatus.

As shown in this figure, in the switching mode power supply apparatus, input AC power is rectified at a bridge diode BD of a first rectifying and smoothing circuit 10, and is converted to DC power at a smoothing condenser C1 so as to be output.

The converted DC power from first rectifying and smoothing circuit 10 is applied to an actuating power supply unit 20, and the actuating power supply unit 20 steps down a high output voltage of the first rectifying and smoothing circuit 10 so as to actuate a pulse width modulation (PWM) control unit 30 which performs pulse width modulation.

When a switching transistor FET performs switching of the PWM waveform provided by the PWM controller 30, a switching transformer TRANS receives a power output from the first rectifying and smoothing circuit 10 at a first coil 32 and accumulates the alternating power at second and third coils 33 and 34, respectively.

The power accumulated at the second coil 33 passes through a diode D1 and a smoothing condenser C2 at the second rectifying and smoothing circuit 40, is converted to DC power in accordance with a wire-winding ratio of the coils 32 and 33 of the switching transformer TRANS, and is outputted as a DC output voltage so as to be supplied to a load circuit.

Meanwhile, the power accumulated at the third coil 34 of the switching transformer TRANS passes through a diode D2 and the smoothing condenser C3 of the third rectifying and smoothing circuit 50, and is converted to DC power in accordance with a wire-winding ratio of the coils 32 and 34 of the switching transformer TRANS.

This DC power is inputted to a constant-voltage circuit 60 so as to be converted to a constant voltage, and the converted constant voltage is supplied to the PWM controller 30. The output voltage of the constant-voltage circuit 60 serves as a driving power after the PWM controller 30 is normally actuated.

That is, the PWM controller 30 outputs a PWM waveform having a predetermined frequency and duty cycle, so that the switching mode power supply apparatus is driven, and DC power with a predetermined value is outputted to the load circuit. In this respect, the power for the initial actuation is supplied by the actuating power source 20, which is the cut off, and output voltage of the constant-voltage circuit 60 is then used as the driving power source.

The output voltage of the actuating power supply unit 20 and the constant-voltage circuit 60 is maintained within a predetermined value for the PWM controller 30 to normally operate. If a larger voltage beyond the predetermined value is supplied, an overvoltage protection circuit provided within the PWM controller 30 is actuated, and the operation of the PWM controller 30 is stopped.

When the switching mode power supply apparatus normally outputs DC power, a feedback controller 70 receives it and applies a feedback control signal to the PWM controller 30 in accordance with variation in the value.

Namely, when the output voltage of the second rectifying and smoothing circuit 40, which is the output of the switching mode power supply apparatus, becomes larger, the feedback controller 70 exerts control so that the duty cycle of the waveform outputted from the PWM controller 30 is reduced; conversely, when the output voltage of the second rectifying and smoothing circuit 40 becomes smaller, the feedback controller 70 exerts control so that the duty cycle of the waveform outputted from the PWM controller 30 is increased. Thus, the output voltage of the switching mode power supply apparatus is always kept constant.

However, in the switching mode power supply apparatus as described above, if an input alternating voltage becomes smaller than a normal value (brown-out condition), the voltage accumulated at the second coil 33 of the switching transformer TRANS becomes smaller, and this is detected by the feedback controller 70. Then, the feed back controller 70 applies a control signal to the PWM controller 30 so that it can increase the duty cycle of the output waveform.

In this case, the voltage that the switching voltage TRANS is able to accumulate at the second coil 33 is constant because it is related to the voltage supplied to the first coil 32 and the wire-winding ratio of the coils 32 and 33. As a result, the current accumulated at the second coil 33 increases as much as the enlarged duty cycle width of the PWM pulse.

As the current accumulated at the second coil 33 increases, circuit devices consisting of the switching mode power supply apparatus as well as circuit devices of the load circuit connected to an output terminal of the switching mode power supply apparatus, can malfunction or be damaged due to an overcurrent, causing a problem in that the equipment employing the switching mode power supply apparatus breaks down.

Figure 2:
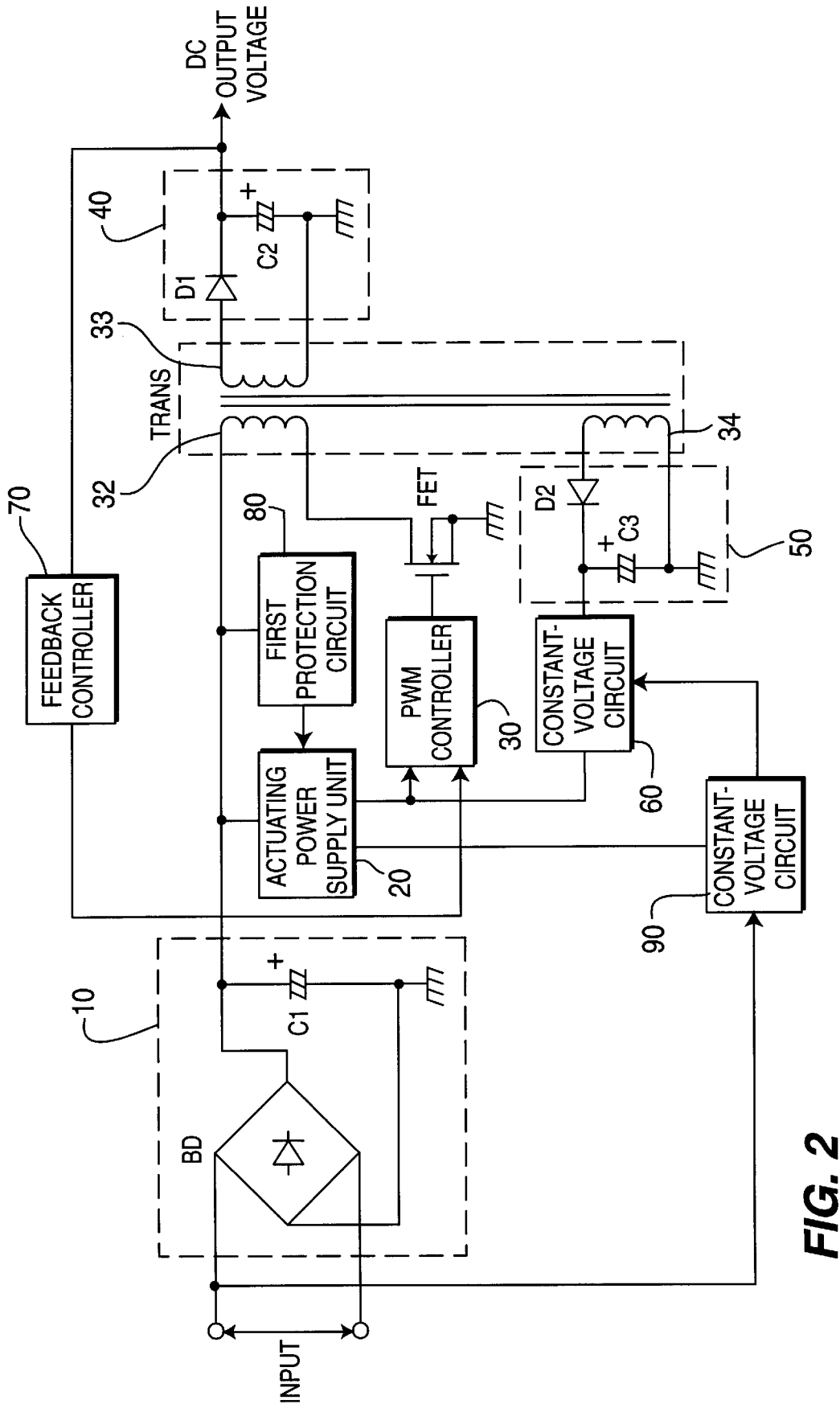
FIG. 2 is a block diagram of switching mode power supply apparatus having a low voltage protection circuit in accordance with the present invention.

FIG. 2 is a block diagram of a switching mode power supply apparatus having a low voltage protection circuit in accordance with the present invention.

As shown in this drawing, the switching mode power supply apparatus having a low voltage protection circuit in accordance with the present invention includes a first protection circuit 80 and a second protection circuit 90 in addition to the elements of the switching mode power supply apparatus shown in FIG. 1. The operation of the elements common to FIGS. 1 and 2 are the same as described above with reference to FIG. 1. The first protection circuit 80 is provided for actuating the switching mode power supply apparatus under a brown-out condition. After receiving an output voltage from a first rectifying and smoothing circuit 10, if the value thereof becomes smaller than a predetermined value, the first protection circuit 80 controls an actuating power supply unit 20 and causes it not to be driven.

The second protection circuit 90 is provided in anticipation of the occurrence of a brown-out condition while the switching mode power supply apparatus is in normal operation after being actuated. This circuit is operated upon receipt of a driving power source from the actuating power supply unit 20, and controls in such a way that, when an input alternating current voltage becomes lower than a pre-determined value, the output voltage of the constant-voltage circuit 60 increases so that a driving voltage sufficient to operate an overvoltage protection circuit of the PWM controller 30 is supplied to the PWM controller 30, thereby to stop the operation of the PWM controller 30.

Figure 3:
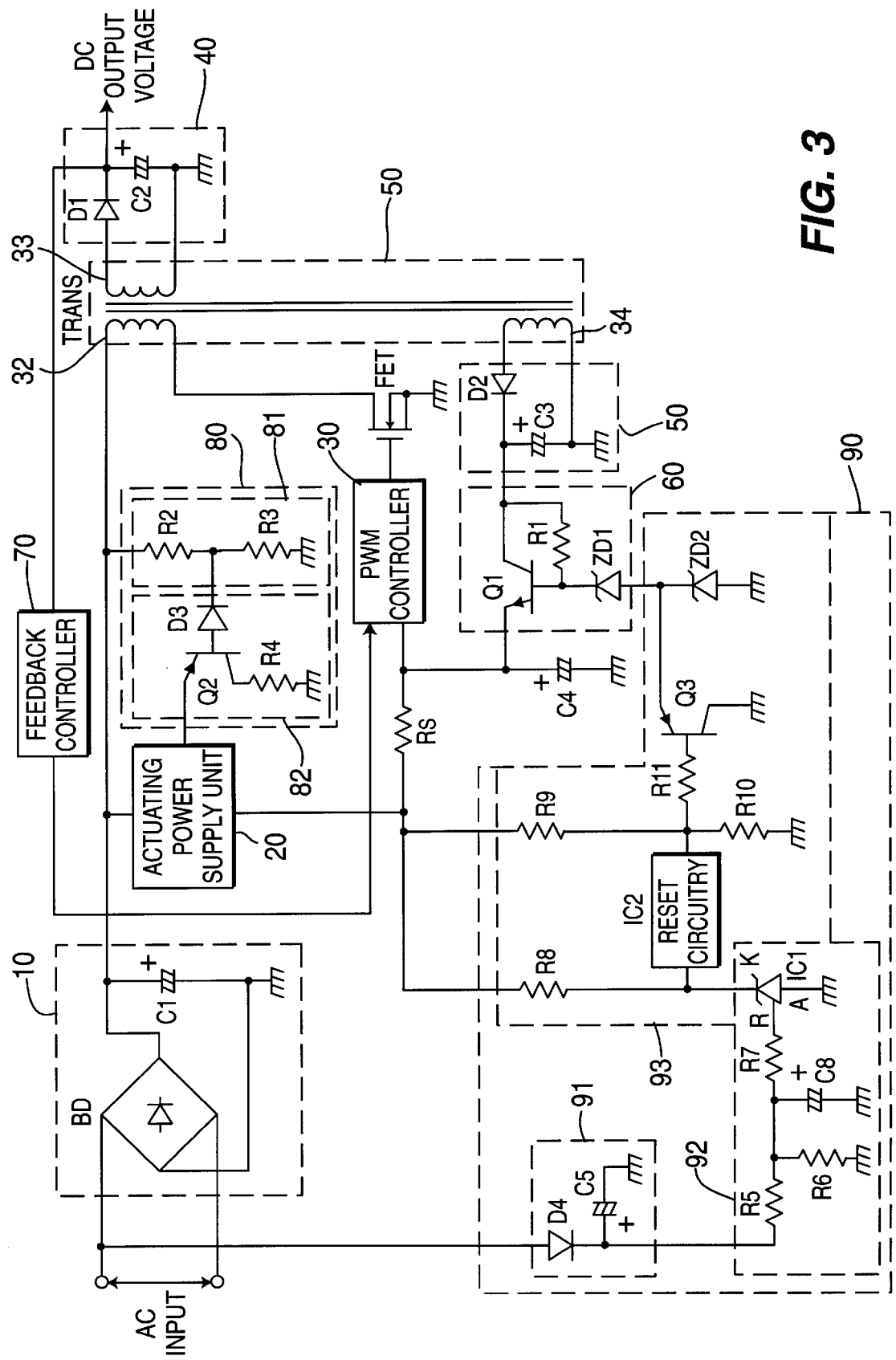
FIG. 3 is a circuit diagram of one embodiment of FIG. 2.

FIG. 3 is a circuit diagram of one embodiment of Fig. 2.

As shown in this figure, the first protection circuit 80 includes: a first voltage sensor 81 for determining whether an output voltage of the first rectifying and smoothing circuit 10 is below a predetermined voltage value, which is the minimal value of allowable voltage where the switching mode power supply apparatus is normally operated; and an actuating power source controller 82 for lowering the driving power of the actuating power supply unit 20 to enable the actuating power supply unit 20 not to be driven when the output voltage is below the predetermined voltage value upon receipt of the output voltage from the first voltage sensor 81.

The first voltage sensor 81 is a voltage distribution circuit having resistors R2 and R3.

The actuating power source controller 82 includes a diode D3, a transistor Q2 and a resistance R4.

The second protection circuit 90 includes: an input rectifying and smoothing unit 91 for rectifying and smoothing an input alternating current voltage; a second voltage sensor 92 for outputting a reset signal when the output voltage of the input rectifying and smoothing unit 91 is lower than a pre-set value; and a constant-voltage controller 93 for outputting a control signal which heightens the output voltage when the reset signal is received from the second voltage sensor 92.

The input rectifying and smoothing unit 91 includes a diode D4 and a smoothing condenser C5.

The second voltage sensor 92 includes a plurality of resistances R5, R6 and R7, a smoothing condenser C6 and a reference device IC1.

The constant-voltage controller 93 includes a reset circuit IC2, a plurality of resistances R8, R9, R10 and R11, a transistor Q3 and a zener diode ZD2.

Operation of the switching mode power supply apparatus having a low voltage protection circuit in accordance with the present invention, as constructed above, will now be described.

First, when a brown-out condition occurs when the switching mode power supply apparatus is being actuated, as to the first protection circuit 80, if the output voltage of the first rectifying and smoothing circuit 10, as divided by the resistances R2 and R3 of the first voltage sensor 81, is smaller than a value resulting from subtraction of a step-down voltage Vf at the diode D3 and at a base-emitter voltage Vbe of the transistor Q2 from the voltage of the emitter of the transistor Q2 of the actuating power source controller 82, the transistor Q2 is turned on so that the actuating power supply unit 20 cannot be operated normally.

Namely, when the transistor Q2 is turned on, the added value between the emitter-collector voltage of the transistor Q2 and the voltage applied to the resistance R4 connected to the collector becomes less than the voltage that can operate the actuating power supply unit 20.

Accordingly, after being imposed on a charging condenser C4 through an actuating resistance Rs, the actuating power is not applied to the PWM controller 30, so that the switching mode power supply apparatus cannot be actuated.

On the other hand, when a brown-out condition occurs while the switching mode power supply apparatus is being operated normally after being actuated, the second protection circuit 90 is operated.

That is, an input alternating current voltage is applied to the input rectifying and smoothing circuit 91, it is half-wave rectified through the diode D4, and it is then smoothed to a DC voltage in the smoothing condenser C5 so as to be applied to the second voltage sensor 92.

The input rectifying and smoothing unit 91 may be constructed as a circuit where the input AC voltage is full-wave rectified, and is then smoothed to a DC voltage by using a bridge diode, and the condenser C6 (connected in parallel with the voltage dividing resistance R6) smooths the divided voltage.

The output voltage of the input rectifying and smoothing circuit 91 is divided by the two resistances R5 and R6 in the second voltage sensor 92, and corresponds to a value below the pre-set voltage value that is the minimal value of allowable voltage at which the switching mode power supply apparatus is operated normally. That value is applied to a reference terminal R of the reference device ICI through a current limiting resistance R7.

As for the reference device ICI, such a device has the characteristics that a current flows between the cathode K and the anode A when the voltage applied to the reference terminal R is larger than a predetermined reference value. Therefore, when the voltage of the reference terminal R is decreased as described above, no current flows between the cathode K and the anode A.

Accordingly, the output voltage of the actuating power supply unit 20 is applied to the input terminal of the reset circuit IC2 as a reset signal through the current limiting resistance R8.

The reset circuit IC2 can be constructed by using an adequate integrated circuit or separated circuit devices. Its function is such that a predetermined voltage is outputted only when a voltage greater than a value pre-set at the input terminal is applied. The above-described reset signal is inputted, and a control signal which turns off the transistor Q3 of the constant-voltage controller 93 is applied to the base terminal of transistor Q3 through the current limiting resistance R11.

The resistances R9 and R10 are bias resistances for the transistor Q3 and its surrounding circuitry.

The constant-voltage circuit 60 includes a general common base transistor Q1 having a resistance R1 and zener diode ZD1 connected to its base. When the switching mode power supply apparatus is operated normally, since the transistor Q3 of the second protection circuit 90 is in a state of 'ON', the output voltage provided to the driving power source of the PWM controller 30 is determined by the zener diode ZD1 which is not bypassed by the transistor Q3.

However, when a control signal is generated by the constant-voltage controller 93 of the second protection circuit 90 and the transistor Q3 is turned off, two zener diodes ZD1 and ZD2 are connected in series to the base transistor Q1 of the constant-voltage circuit 60, with the result that the output voltage value is increased by as much as the zener voltage of the newly connected zener diode ZD2.

At this time, the increased output voltage of the constant-voltage circuit 60 is to be set to such a value that the overvoltage protection circuit inserted in the PWM controller 30 is operated. As a result, the overvoltage protection circuit of the PWM controller 30 is operated by the control signal generated by the constant-voltage controller 93 so that the operation of the PWM controller 30 is stopped, thereby stopping the entire operation of the switching mode power supply apparatus.

Meanwhile, when the input AC voltage falls to a normal voltage, since the voltage applied to the reference terminal R of the reference device IC1 is greater than a predetermined reference value, a current flows between the cathode K and the anode A, and the input voltage of the reset circuit IC2 becomes low and the transistor Q3 maintains an 'ON' state.

Therefore, the output voltage of the constant-voltage circuit 60 is determined by a single zener diode ZD1, and the PWM controller 30 is driven by the normal voltage.

As so far described, in the switching mode power supply apparatus having a low voltage protection circuit in accordance with the present invention, the protection circuit has a simple construction and is provided not to actuate the switching mode power supply apparatus or to stop the operation of the switching mode power supply apparatus under the brown-out condition, where the voltage value of the input AC is reduced to a predetermined value. Thus, without the necessity of a big power control device, a complicated control circuit or an auxiliary power source for driving the control circuit, the switching mode power supply apparatus, as well as the circuit devices of the load circuit connected to the switching mode power supply apparatus, can be protected safely from an overcurrent caused by the input of a low AC voltage. In addition, reliability of the electric and electronic equipments having the switching mode power supply apparatus as the DC power source generating unit can be attained.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A switching mode power supply apparatus having a low voltage protection circuit comprising:
    a first rectifying and smoothing circuit for rectifying and smoothing an input alternating current voltage to output a direct voltage;
    an actuating power supply unit for receiving the direct voltage from the first rectifying and smoothing circuit and for converting it to a predetermined DC voltage;
    a PWM controller actuated by the predetermined DC voltage from the actuating power supply unit for outputting a predetermined pulse width modulation waveform, said PWM controller having an overvoltage protection circuit;
    a switching transistor which is switched by the output waveform of the PWM controller;
    a switching transformer having first, second and third coils for accumulating output power of the first rectifying and smoothing circuit, as applied to the first coil, at the second and third coils in accordance with the switching of the switching transistor;
    a second rectifying and smoothing circuit for rectifying and smoothing a voltage accumulated in the second coil, and for outputting a predetermined DC voltage supplied to a load circuit;
    a third rectifying and smoothing circuit for rectifying and smoothing a voltage accumulated at the third coil of the switching transformer for outputting another predetermined DC voltage;
    a constant-voltage circuit for receiving the predetermined DC voltage from the third rectifying and smoothing circuit and for outputting the driving voltage of the PWM controller;
    a first protection circuit for receiving the direct voltage from the first rectifying and smoothing circuit and for controlling in such a way that the actuating power supply unit is not driven when the value of the direct voltage from the first rectifying and smoothing circuit becomes lower than a pre-determined value; and
    a second protection circuit for controlling such that, when the input alternating current voltage becomes lower than a pre-determined value, the driving voltage of the PWM controller outputted by the constant voltage circuit is sufficient to operate the overvoltage protection circuit of the PWM controller to thereby stop the operation of the PWM controller.

2. The apparatus as claimed in claim 1, further comprising a feedback controller for receiving a variation of an output voltage of the second rectifying and smoothing circuit, and for generating a control signal and applying it to the PWM controller.

3. The apparatus as claimed in claim 2, wherein the first protection circuit includes:
    a voltage sensor for determining whether an output voltage of the first rectifying and smoothing circuit is below a predetermined voltage value; and
    an actuating power source controller for lowering a driving power of the actuating power supply unit to cause the actuating power supply unit not to be driven when the output voltage of the first rectifying and smoothing circuit is below the predetermined value upon receipt of the output voltage from the voltage sensor.

4. The apparatus as claimed in claim 2, wherein the second protection circuit includes:
    an input rectifying and smoothing unit for rectifying and smoothing an input alternating current voltage;
    a voltage sensor for outputting a reset signal when an the output voltage of the input rectifying and smoothing unit is lower than a pre-set value; and
    a constant-voltage controller for outputting a control signal which heightens the output voltage of the input rectifying and smoothing unit when the reset signal is generated by the voltage sensor.

5. The apparatus as claimed in claim 4, wherein the input alternating current voltage is half-wave rectified and smoothed by the input rectifying and smoothing unit.

6. The apparatus as claimed in claim 4, wherein the input alternating current voltage is full-wave rectified and smoothed by the input rectifying and smoothing unit.

7. The apparatus as claimed in claim 1, wherein the second protection circuit includes:
    an input rectifying and smoothing unit for rectifying and smoothing an input alternating current voltage;
    a voltage sensor for outputting a reset signal when an the output voltage of the input rectifying and smoothing unit is lower than a pre-set value; and
    a constant-voltage controller for outputting a control signal which heightens the output voltage of the input rectifying and smoothing circuit when the reset signal is generated by the voltage sensor.

8. The apparatus as claimed in claim 1, wherein the first protection circuit includes:
    a voltage sensor for determining whether an output voltage of the first rectifying and smoothing circuit is below a predetermined voltage value; and
    an actuating power source controller for lowering a driving power of the actuating power supply unit to cause the actuating power supply unit not to be driven when the output voltage of the first rectifying and smoothing circuit is below the predetermined value upon receipt of the output voltage from the voltage sensor.

9. A switching mode power supply apparatus having a low voltage protection circuit, comprising:
    input circuit means responsive to an input alternating current voltage for providing a predetermined DC voltage;
    PWM controller means responsive to the predetermined DC voltage from the input circuit means for outputting a predetermined pulse width modulation waveform, said PWM controller means having an overvoltage protection circuit;
    switching transistor means for being switched by the waveform outputted by the PWM controller means so as to provide a switch output;

switching transformer means including first, second and third coils for accumulating output power from said input circuit means, as applied to the first coil, at the second and third coils in accordance with the switching output of the switching transistor means;

output circuit means responsive to a voltage accumulated at the second coil for outputting a further predetermined DC voltage;

additional circuit means responsive to a voltage accumulated at the third coil for outputting a driving voltage to the PWM controller means;

first protection circuit means responsive to an output voltage from the input circuit means for preventing operation of said input circuit means when the value of the output voltage of the input circuit means is less than a predetermined value; and second protection circuit means responsive to the input alternating current voltage being less than a preset value for controlling said additional circuit means so that the driving voltage to the PWM controller means outputted by the additional circuit means is sufficient to operate the overvoltage protection circuit of said PWM controller means, thereby stopping operation of said PWM controller means.

10. The apparatus as claimed in claim 9, further comprising feedback controller means responsive to an output voltage of the output circuit means for generating a control signal and applying the control signal to the PWM controller means.

11. The apparatus as claimed in claim 10, wherein the first protection circuit means includes:

a first voltage sensor for determining whether an output voltage of the input circuit means is less than a predetermined voltage value; and an actuating power source controller for lowering a driving power of the input circuit means so as to prevent driving of said input circuit means when the output voltage of said input circuit means is below the predetermined value.

12. The apparatus as claimed in claim 10, wherein the second protection circuit means includes:

an input rectifying and smoothing unit for rectifying and smoothing an input alternating current voltage;

a voltage sensor for outputting a reset signal when an output voltage of the input rectifying and smoothing unit is lower than a pre-set value; and a constant-voltage controller for outputting a control signal which heightens the output voltage input rectifying and smoothing unit when the reset signal is generated by the voltage sensor.

13. The apparatus as claimed in claim 12, wherein the input alternating current voltage is half-wave rectified and smoothed by the input rectifying and smoothing unit.

14. The apparatus as claimed in claim 12, wherein the input alternating current voltage is full-wave rectified and smoothed by the input rectifying and smoothing unit.

15. The apparatus as claimed in claim 9, wherein the second protection circuit means includes:

an input rectifying and smoothing unit for rectifying and smoothing an input alternating current voltage;

a voltage sensor for outputting a reset signal when an output voltage of the input rectifying and smoothing unit is lower than a pre-set value; and a constant-voltage controller for outputting a control signal which heightens the output voltage input rectifying and smoothing unit when the reset signal is generated by the voltage sensor.

16. The apparatus as claimed in claim 9, wherein the first protection circuit means includes:

a first voltage sensor for determining whether an output voltage of the input circuit means is less than a predetermined voltage value; and an actuating power source controller for lowering a driving power of the input circuit means so as to prevent driving of said input circuit means when the output voltage of said input circuit means is below the predetermined value.

17. The apparatus as claimed in claim 9, wherein said input circuit means comprises a rectifying and smoothing circuit for rectifying and smoothing the input alternating current voltage to generate an output voltage, and an actuating power supply unit for converting the output voltage of the rectifying and smoothing circuit to the predetermined DC voltage.

18. The apparatus as claimed in claim 17, wherein said first protection circuit means prevents operation of said input circuit means by preventing driving of said actuating power supply unit when the value of the output voltage of the rectifying and smoothing circuit is less than the predetermined value.

19. The apparatus as claimed in claim 9, wherein said output circuit means comprises a rectifying and smoothing circuit.

20. The apparatus as claimed in claim 9, wherein said additional circuit means comprises a rectifying and smoothing circuit for generating another DC voltage, and a constant-voltage circuit responsive to said another DC voltage for outputting the driving voltage to the PWM controller means.

21. The apparatus as claimed in claim 20, wherein said second protection circuit means controls said constant-voltage circuit to produce the driving voltage at a level high enough to operate the overvoltage protection circuit of said PWM controller means, thereby stopping the operation of said PWM controller means.

22. The apparatus as claimed in claim 9, wherein said first protection circuit means comprises:

a transistor having first, second and third electrodes, said first electrode being connected to said input circuit means;

a resistor connecting said second electrode to ground;

a diode connected to said third electrode; and a voltage divider connecting said diode to said output transformer means.

23. The apparatus as claimed in claim 9, wherein said second protection circuit means comprises:

a transistor having first, second an third electrodes, said second electrode being connected to ground and said third electrode being connected to said output circuit means;

a diode connected between said third electrode and ground;

a resistor connected to said first electrode;

a reset circuit connected to said resistor;

a smoothing circuit connected to said reset circuit; and a voltage sensor connected between said smoothing circuit and said input circuit means.

24. A switching mode power supply apparatus having a low voltage protection circuit, comprising:

input circuit means responsive to an input alternating current voltage for providing a predetermined DC voltage;

PWM controller means connected to an output of said input circuit means and responsive to the predetermined DC voltage from the input circuit means for outputting a predetermined pulse width modulation waveform, said PWM controller means having an overvoltage protection circuit;

switching transistor means connected to an output of said PWM controller means for being switched by the waveform outputted by the PWM controller means so as to provide a switch output;

switching transformer means connected to said input means and to said switching transport means, and including first, second and third coils for accumulating output power from said input circuit means, as applied to the first coil, at the second and third coils in accordance with the switching output of the switching transistor means;

output circuit means responsive to a voltage accumulated at the second coil for outputting a further predetermined DC voltage;

additional circuit means connected to the third coil and responsive to a voltage accumulated at the third coil for outputting a driving voltage to the PWM controller means;

first protection circuit means responsive to an output voltage from the input circuit means for preventing operation of said input circuit means when the value of the output voltage of the input circuit means is less than a predetermined value; and second protection circuit means responsive to the input alternating current voltage being less than a preset value for controlling the additional circuit means to stop operation of said PWM controller means.

25. The apparatus as claimed in claim 24, further comprising feedback controller means responsive to an output voltage of the output circuit means for generating a control signal and applying the control signal to the PWM controller means.

26. The apparatus as claimed in claim 24, wherein the second protection circuit means includes:

an input rectifying and smoothing unit for rectifying and smoothing an input alternating current voltage;

a voltage sensor for outputting a reset signal when an output voltage of the input rectifying and smoothing unit is lower than a pre-set value; and a constant-voltage controller for outputting a control signal which heightens the output voltage input rectifying and smoothing unit when the reset signal is generated by the voltage sensor.

27. The apparatus as claimed in claim 24, wherein the first protection circuit means includes:

a first voltage sensor for determining whether an output voltage of the input circuit means is less than a predetermined voltage value; and an actuating power source controller for lowering a driving power of the input circuit means so as to prevent driving of said input circuit means when the output voltage of said input circuit means is below the predetermined value.

28. The apparatus as claimed in claim 24, wherein said input circuit means comprises a rectifying and smoothing circuit for rectifying and smoothing the input alternating current voltage to generate an output voltage, and an actuating power supply unit for converting the output voltage of the rectifying and smoothing circuit to the predetermined DC voltage.

29. The apparatus as claimed in claim 28, wherein said first protection circuit means prevents operation of said input circuit means by preventing driving of said actuating power supply unit when the value of the output voltage of the rectifying and smoothing circuit is less than the predetermined value.

30. The apparatus as claimed in claim 24, wherein said output circuit means comprises a rectifying and smoothing circuit.

31. The apparatus as claimed in claim 24, wherein said additional circuit means comprises a rectifying and smoothing circuit for generating another DC voltage, and a constant-voltage circuit responsive to said another DC voltage for outputting the driving voltage to the PWM controller means; and wherein said second protection circuit means controls said constant-voltage circuit to produce the driving voltage at a level high enough to operate the overvoltage protection circuit of said PWM controller means, thereby stopping the operation of said PWM controller means.

32. The apparatus as claimed in claim 24, wherein said first protection circuit means comprises:

a transistor having first, second and third electrodes, said first electrode being connected to said input circuit means;

a resistor connecting said second electrode to ground;

a diode connected to said third electrode; and a voltage divider connecting said diode to said output transformer means.

* * * * *